Sept. 20, 1932.  K. P. GAMBLE  1,878,693

FILM MAGAZINE

Filed Feb. 25, 1930

Inventor:
Kent P. Gamble,
by Charles E. Mullen
His Attorney.

Patented Sept. 20, 1932

1,878,693

UNITED STATES PATENT OFFICE

KENT P. GAMBLE, OF SCHENECTADY, NEW YORK, ASSIGNOR TO GENERAL ELECTRIC COMPANY, A CORPORATION OF NEW YORK

FILM MAGAZINE

Application filed February 25, 1930. Serial No. 431,276.

My invention relates to the film magazines of motion picture cameras, sound recorders, etc. The film magazine of a form of motion picture camera now in common use is a unitary structure comprising two magazine portions which are formed integral with an intermediate portion, the latter being adapted to rest upon and to be secured to the camera. When such a magazine structure is loaded with film ready for use, one magazine portion contains the roll of unexposed film and the other magazine portion is empty, the film during the exposure being passed from the one magazine portion through the camera into the other magazine portion. Whenever the operator expects to use several rolls of film in succession he takes with him the same number of the unitary magazine structures, each of which has one magazine portion empty and the other containing a roll of fresh film. Similarly after the exposures are made the same magazine structures must be transported to the dark room for development and each contains film in but one portion. Not only is the transportation of so much unnecessary weight objectionable but the relatively large amount of space required both in transportation of the films and in the storage thereof preparatory to being exposed or developed is likewise objectionable. It is the object of my invention to provide an improved film magazine structure with which objections such as those noted above are avoided.

My invention will be better understood from the following description taken in connection with the accompanying drawing, and its scope will be pointed out in the appended claims.

Figure 1:
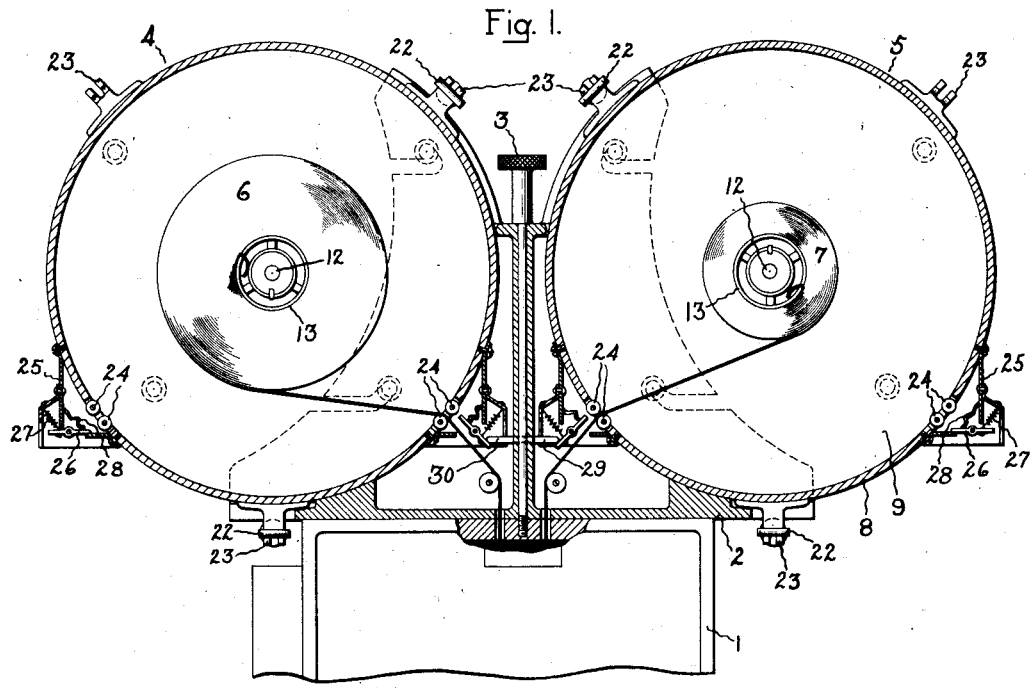
Figure 2:
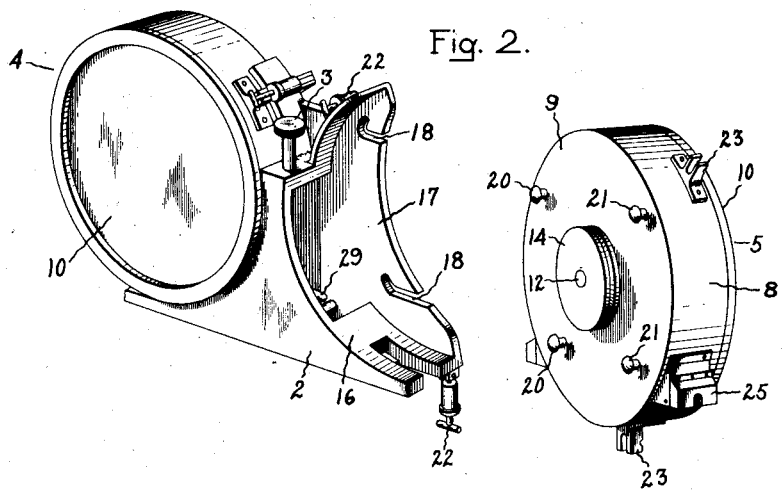

Referring to the drawing, Fig. 1 is a longitudinal view of one embodiment of my invention and Fig. 2 is a perspective view thereof with portions thereof separated.

The part 1 in the drawing represents either a motion picture camera, a sound recorder or any other device through which film is adapted to be passed for exposure. Resting upon and secured to the part 1, which for convenience will be termed simply a recorder, is the intermediate member 2 which by the screw 3 is detachably secured to the recorder. It is shaped to receive the two film magazines 4 and 5 and has suitable film passages therein which connect with similar film passages in the recorder. These two magazines are identical in construction and are interchangeable, one serving to hold the take-off film roll 6 and the other serving to hold the take-up film roll 7. Magazines 4 and 5 each comprises a receptacle having an integral peripheral portion 8 and rear end-head 9 and having a front detachable light-proof cover 10. Through the end-head 9 extends the short shaft 12 to which is attached the film spool 13 within the magazine and the usual take-up pulley 14 outside the magazine. The intermediate member 2 is shown having curved socket portions 16 to receive the magazine and rear flanges 17 in which are formed the slots 18. These slots are constructed to receive either the pins 20 or the pins 21 depending upon whether the magazine is in the film take-off position or is in the film take-up position, namely, in the left or right position as viewed in Fig. 1. It will be noted that the inner ends of the slots 18 turn upwardly so that after the magazine is seated in the socket portion 16 of the intermediate member it is given a slight rotative movement to bring it into its final position, the purpose of which will be explained later. Each magazine is locked in its final position by a pair of spring fasteners 22 which are adapted to be hooked over two of the three bifurcated prongs 23 carried by the magazine.

In the peripheral portion of each magazine are two film openings at each of which are mounted the usual guide rollers 24 and covering each opening is the light excluding structure 25 including the valve 26 yieldingly held against its seat by the spring 27 and the flexible light baffle 28. Projecting from a central web portion of the intermediate member 2 are the pins 29 and 30 which are so positioned that when the magazines are seated against the member 2 and given the rotative movement mentioned above the two adjacent valves are opened. Conversely the slight rotative movement of a magazine incident to the removal of the same after the two securing hooks 23 have been detached allows the light valve thereof to close which closure is complete before the magazine can be separated from the member 2 permitting light to enter it. If it is found desirable one or more finger openings closed by trap doors may be provided in the sides of member 2 to facilitate the threading of the film.

With the construction which I have devised and described above, the weight and space requirements of magazine equipment for a number of film rolls is reduced to a minimum. If, for example, the operator knows he will require five rolls of film for a certain picture or series of pictures he need take only five magazines each full of fresh film, there being one empty magazine on the camera in the film take-up position. After the first full magazine has been used up while in the film take-off position, the magazine in the take-up position which now is full of exposed film will be removed and the magazine in the film take-off position transferred from one socket of member 2 by merely shifting it without any turning over or rotation to the other socket of member 2. The second magazine full of fresh film will now be secured to member 2 in the film take-off position. This procedure will be repeated until all the five rolls of film are used up after which the operator need return for development only five magazines full of exposed film, the one remaining empty magazine being transferred to the film take-up position ready for future use.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. A film assembly comprising a member adapted to be secured to a recorder, a film magazine having a film opening and a light valve therefor, cooperating means on said member and magazine constructed to cause the magazine to have an angular movement when being attached to the member and means operative in response to said angular movement to actuate said light valve.

2. A film magazine assembly comprising a central member, a film magazine adapted to be secured thereto at either side thereof, cooperating securing means on the member and magazine, said means being operative in the two positions of the magazine by a slight rotative movement thereof respectively in opposite directions, said magazine having a separate film opening for use in each of the two positions, a light valve for each opening and means on the member for opening the valve in response to said rotative movement of the magazine.

In witness whereof, I have hereunto set my hand this 24th day of February, 1930.

KENT P. GAMBLE.